March 28, 1961 F. W. FORD, JR 2,977,151
WHEEL FLANGE PROTECTORS
Filed June 6, 1956 2 Sheets-Sheet 1
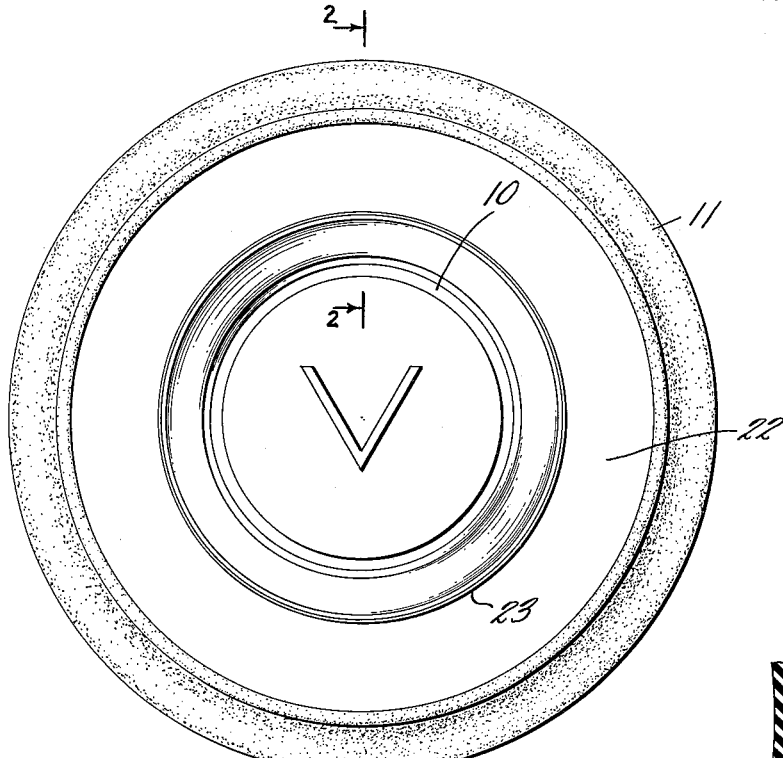
FIG.1.
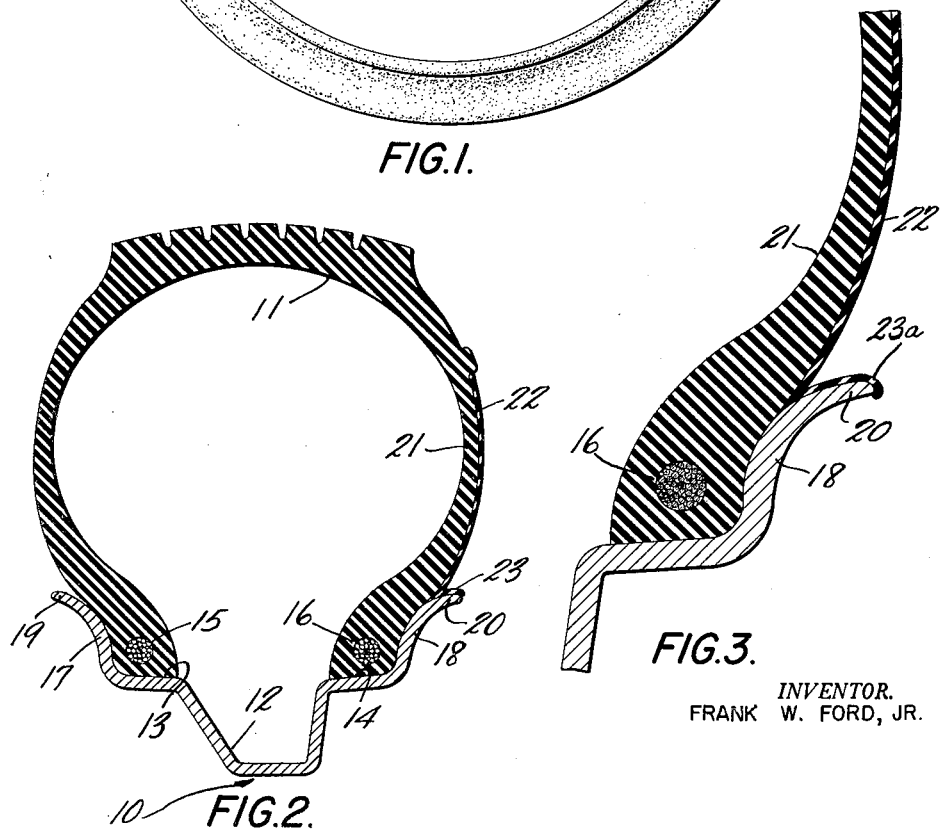
FIG.2.
FIG.3.
INVENTOR.
FRANK W. FORD, JR.

March 28, 1961  F. W. FORD, JR  2,977,151
WHEEL FLANGE PROTECTORS
Filed June 6, 1956  2 Sheets-Sheet 2
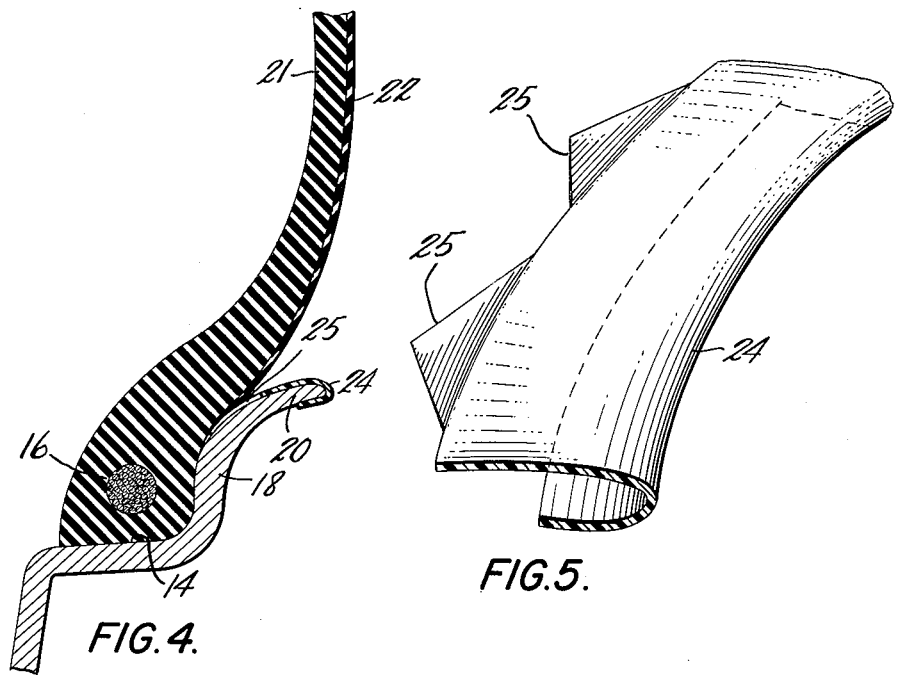
FIG. 4.
FIG. 5.
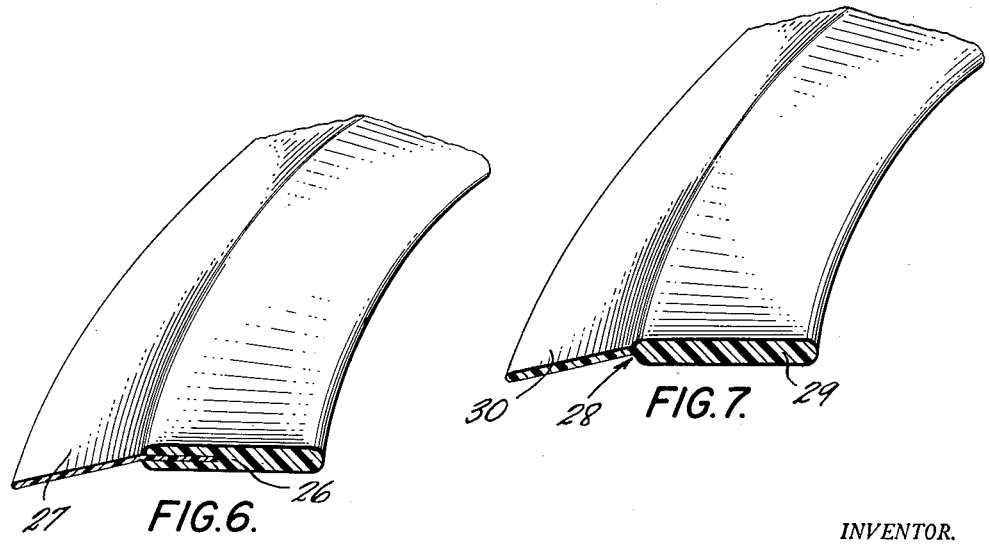
FIG. 6.
FIG. 7.
INVENTOR.
FRANK W. FORD, JR.

2,977,151
WHEEL FLANGE PROTECTORS

Frank W. Ford, Jr., 360 1st Ave., New York 10, N.Y.

Filed June 6, 1956, Ser. No. 589,819

1 Claim. (Cl. 301—37)

This invention relates to apparatus for protecting rim flanges on wheels mounting pneumatic tires.

The use of white wall pneumatic tires has greatly increased in the past few years due to both a heightened public consciousness of better automobile appearance and the fact that adequate tire scuff ridges have been provided adjacent to the tread to protect the white rubber from curbs and other obstructions. However, such white sidewalls still require frequent cleansing in order to maintain their decorative effect, such cleansing usually being performed with gritty soaps, steel wool and similar substances. While these cleansing agents quickly restore a gleaming white finish to the tire sidewalls, they also tend to remove the layer of paint on the outer shoulder of the wheel flange. After a few tire cleansings, all of the paint will be removed from this shoulder and it will rust. Subsequently, such rust when moistened with road water will run onto the white sidewall causing unsightly brown streaking.

The present invention provides a protective flap interposed between a white tire sidewall and wheel flange to retain the paint layer and preclude flange rusting and discoloration of the white sidewall. In one embodiment of the invention, the protective flap may be formed integrally with the tire and interposed between the white sidewall and flange when the tire is mounted on the wheel.

In another embodiment of the invention, a protective strip may be inserted between the wheel rim and the tire to protect the painted flange from abrasion by the cleansing agents used on the white sidewalls.

In still a further modification, a protective strip may be adhered to a suitable portion of the wheel by an adhesive in order to protect the paint layer on the wheel flange.

These and further advantages of the invention will be more readily understood when the following description is read in connection with the accompanying drawings; in which:

Figure 1 is a plan view of a wheel and tire embodying the principles of the present invention;

Figure 2 is a partial transverse section, somewhat enlarged, of Figure 1 showing the rim mounted tire in detail and taken along the view line 2—2 looking in the direction of the arrows;

Figure 3 is a fragmentary transverse section of a rim mounted tire illustrating a further embodiment of the present invention;

Figure 4 is a fragmentary section similar to Figure 3 illustrating another embodiment of the present invention;

Figure 5 is a view in perspective of the protective strip illustrated in Figure 4;

Figure 6 is a view in perspective of another form of protective strip according to the invention; and Figure 7 is still another form which the inventive protective strip may take.

Referring to an illustrative embodiment of the invention in greater detail with particular reference to Figures 1 and 2, a wheel 10 mounts a tire 11 in a conventional manner. The wheel 10 includes a lopsided generally U-shaped rim 12 having seatings 13 and 14 receiving reinforced tire beads 15 and 16, rim flanges 17 and 18 extending upwardly therefrom. Rolled shoulders 19 and 20 are respectively formed on the edges of the rim flanges 17 and 18, the entire wheel 10 including the rim and shoulders being coated with a layer of paint, not shown as such in the interests of clarity.

An outer sidewall 21 of the tire 11 has a decorative layer of white rubber 22 formed thereon making it necessary to scrub the sidewall often in order to maintain the tire 11 in its original attractive condition. Normally, such scrubbing unavoidably abrades the rolled shoulder 20 removing the paint layer so that in a short time the bare wheel metal rusts and rusty water discolors the white sidewall 22.

In the form of the invention illustrated in Figures 1 and 2, an annular rubber flap 23 extends outwardly from a zone adjacent to the abutment of the flange 18 and the tire sidewall 22 to protect the shoulder 20 from abrasion during cleansing of the white sidewall. Assuming steel wool is being used to scrub the layer 22, when cleansing strokes are executed in the vicinity of the shoulder 20 the rubber flap 23, interposed between the layer 22 being cleansed and the shoulder 20, protects the layer of paint on the latter element. In this manner rusting of the flange 18 and consequent discoloration of the white sidewall 22 are effectively prevented.

If desired the modification of the invention illustrated in Figure 3 may be utilized wherein a contoured flap 23a integral with the tire sidewall 21 extends outwardly above the shoulder 20 and partially envelops it, this construction both eliminating any paint removal from the flange 18 and protecting it from superficial scuffs from high curbs, for example.

If desired, the advantages of the present invention may be obtained even when a protective strip has not been formed integrally with a tire. Referring to Figures 4 and 5, a protective strip 24 carrying pointed retaining tabs 25, wedged between the flange 18 and the tire sidewall 21, curls around the shoulder 20 to protect it very effectively both from abrasion while the white sidewall 22 is being cleansed and from other superficial injuries incurred by scuffing against high curbs and other obstructions. Obviously, a continuous thin flexible retaining band could be substituted for the tabs 25, if desired. The tabs 25 may be inserted a substantial distance between the flange 18 and tire sidewall 21 without impairing the integrity of the tire 10, shown as a tubeless tire, such insertion preferably being made while the tire is at least partially deflated.

The strip 24 may be formed of a transparent or colored plastic which may in the latter instance follow the vehicle color scheme to provide a pleasing effect. For example, various materials may be used to form the strip 24 such as vinyl elastic plastics including copolymers of vinyl acetate and vinyl chloride, cellulose acetate butyrate (aceto-butyrate), polyethylene, synthetic or natural rubber, tetrafluoroethylene ("Teflon") and other suitable substances, glass fibers or similar materials being embedded therein, especially at the edges, if desired to provide added resistance to tearing. Furthermore, the tabs 25 or a continuous retaining band may be molded into the strip, projections being formed on their ends within the strip 24 to hold these members together under stress. Preferably, the strip 24 is contoured to curl and grip the shoulder 20 and also curved to form normally a circle having approximately the radius of the shoulder 20 on the rim 12.

It will be evident that since the outer edge of the strip 24 engages the underside of the shoulder 20, any centrifugal forces developed while the wheel 10 is rotating at high speeds will not serve to tear the strip 24 from the wheel. In other words, the strip 25 tends to grasp and retain itself on the shoulder 20.

If desired, the tabs 25 may be omitted from the strip 24 and a suitable adhesive applied to its inner surface for attaching it to the shoulder 20. Thus, a pressure sensitive adhesive may be provided on the strip 24 which, with its curled configuration, will hold it securely to the shoulder 20. Alternatively, an adhesive may be coated on the strip 24 immediately before it is urged into engagement with the shoulder 20. Of course, the adhesive may be used in combination with the tabs 25 to attach the strip 24 to the shoulder 20.

Another embodiment of the invention is illustrated in Figure 6 in which a strip 26 molded integrally with a thin retaining band 27 may be fastened between the flange 18 and the sidewall 21, as illustrated in Figure 4 in connection with the strip 24. Of course tabs such as shown in Figure 5 could be substituted for the band 27. The strip 26 extends outwardly a sufficient distance to protect the paint on the shoulder 20 in the same manner that the shoulder 23 functions, as discussed in connection with Figure 2.

Referring to still another modification of the invention shown in Figure 7, a strip 28 includes a protective section 29 and a thin retaining band 30 adapted to be inserted between the sidewall 21 and the flange 18. In this instance, the entire strip 28 may be molded from a single plastic material to facilitate its fabrication.

In connection with the protective strips illustrated in Figures 4 to 7, it is desirable under certain conditions to provide fastening devices to secure the strip ends together. For example, the strip ends can be stapled together, cooperating hook and eye elements can be molded into the strip ends, suitable snaps can be embedded in the strip ends, the strip ends may be adhesively secured or other similar fastening arrangements may be utilized.

It should be noted that the use of the protective flap illustrated in the several figures of the drawing does not interfere with the mounting of wheel weights since they may be placed under the flap or pierce it, whichever is more convenient. Furthermore, in connection with the strip 24 shown in Figure 4, a small portion of it may be cut away if desired to permit the mounting of weights. However, this is seldom necessary since present practice for aesthetic reasons tends toward mounting such weights on the inner flange 17. Although theoretically this does not provide for perfect dynamic balance of the wheel 10, it has proven to be a satisfactory balancing method.

It will be understood that the above-described embodiments of the invention are illustrative only and modifications thereof will occur to those skilled in the art. Therefore, the invention is not to be limited to the specific apparatus disclosed herein but is to be defined by the appended claim.

I claim:

In a tire and wheel assembly, an annular mounting flange on the wheel adjacent to and extending outwardly from the outer sidewall of the tire, a thin flexible annular flap molded integrally with the outer sidewall of the tire and curved to conform to and overlay the entire surface of the flange oriented toward the outer sidewall, and the exposed surface of the flap facing the outer sidewall to protect the flange from superficial damage when the outer sidewall is scrubbed.

References Cited in the file of this patent

UNITED STATES PATENTS

| | | |
|---|---|---|
| 1,337,660 | Killen | Apr. 20, 1920 |
| 1,395,770 | Rector | Nov. 1, 1921 |
| 2,709,472 | Hofweber | May 31, 1955 |
| 2,822,016 | Billingsley | Feb. 4, 1958 |
| 2,822,219 | Billingsley | Feb. 4, 1958 |